United States Patent [19]
Berzins et al.

[11] Patent Number: 5,626,945
[45] Date of Patent: *May 6, 1997

[54] REPULPABLE, WATER REPELLANT PAPERBOARD

[75] Inventors: Arnold L. Berzins, Westwood; Tung C. Ma, Fort Lee, both of N.J.; Charles J. Davis, Goshen, N.Y.

[73] Assignee: International Paper Company, Purchase, N.Y.

[*] Notice: The portion of the term of this patent subsequent to Aug. 15, 2014, has been disclaimed.

[21] Appl. No.: 128,582

[22] Filed: Sep. 28, 1993

[51] Int. Cl.$^6$ .................................................. B32B 9/06
[52] U.S. Cl. .................. 428/174; 428/486; 428/507; 428/510; 428/515; 442/84
[58] Field of Search .............................. 428/174, 264, 428/274, 265, 486, 507, 510, 515

[56] References Cited

U.S. PATENT DOCUMENTS

| | | | |
|---|---|---|---|
| 2,526,655 | 10/1950 | Sparks et al. | 260/28.5 |
| 2,756,217 | 7/1956 | Young et al. | 260/28.5 |
| 2,961,421 | 11/1960 | Cohen et al. | 260/29.6 |
| 3,058,938 | 10/1962 | Lindstrom et al. | 260/29.6 |
| 3,260,690 | 7/1966 | Bohnert et al. | 260/29.7 |
| 3,719,514 | 3/1973 | Taylor | 106/210 |
| 4,072,645 | 2/1978 | Cogley, Jr. | 260/29.7 |
| 4,098,944 | 7/1978 | Pollock | 428/284 |
| 4,117,199 | 9/1978 | Gotoh et al. | 428/486 |
| 4,154,618 | 5/1979 | Burke | 106/27 |
| 4,400,440 | 8/1983 | Shaw | 428/511 |
| 4,661,548 | 4/1987 | Parker | 524/204 |
| 4,933,012 | 6/1990 | Goetze et al. | 106/204 |
| 4,972,018 | 11/1990 | Leadbetter | 524/47 |
| 5,080,759 | 1/1992 | Buzby et al. | 162/158 |
| 5,246,544 | 9/1993 | Hollenberg et al. | 162/111 |
| 5,401,562 | 3/1995 | Akao | 428/211 |

FOREIGN PATENT DOCUMENTS

| | | |
|---|---|---|
| 0114441 | 2/1974 | Japan. |
| 1031728 | 9/1974 | Japan. |
| 0099096 | 10/1975 | Japan. |
| 3124183 | 4/1977 | Japan. |
| 8222170 | 6/1982 | Japan. |
| 3101434 | 10/1986 | Japan. |
| 1141135 | 12/1983 | U.S.S.R. |

OTHER PUBLICATIONS

Document entitled: *Corrugated Containers*. Maltenfort, Pulp and Paper Technology (Oct. 1970). Ch. 7–4.
Document entitled: *Mobile Product Data Sheet*. (Dec. 5, 1991).
Technical Data Sheet entitled: *Zinplex 15*. (Nov. 20, 1991).
Technical Data Sheet entitled: *Dow Latex Rap 314NA*. (Nov. 1989).

*Primary Examiner*—John C. Bleutge
*Assistant Examiner*—Randy Gulakowski
*Attorney, Agent, or Firm*—Ostrager, Chong & Flaherty

[57] ABSTRACT

The specification discloses paperboard having a water-repellant coating which includes a polymer matrix/wax mixture and is applied to the paperboard as an aqueous formulation. The polymer matrix includes polymer chains which are ionically cross-linked through pendant carboxylic acid groups to provide, together with the wax, a substantially continuous, water-repellant film which more readily breaks down under the alkaline conditions of repulping. The coated board also exhibits improved release characteristics and resistance to blocking, and is particularly well-suited in corrugated box constructions used in shipping containers for perishable food items such as meats, poultry, fishery products, fruits and vegetables.

13 Claims, 2 Drawing Sheets

REPULPABLE, WATER REPELLANT PAPERBOARD

The present invention relates to water repellant paper products such as coated paperboard and the like. More particularly, the invention relates to a water-repellant board which exhibits improved repulpability, improved release characteristics and improved resistance to blocking.

Perishables, such as ice-packed chicken, meat, fishery products, fruits and vegetables are typically shipped in boxes or containers formed of corrugated paperboard which has been coated with a water repellant material. Conventional water-repellant coatings include natural and synthetic waxes and various synthetic organic compounds such as ethylene vinyl acetate. Such coatings improve the water resistance and decrease the water vapor transmission rate of the board so that the box is better suited for shipping perishables in a damp environment than an uncoated board. However, once used, such coated shipping boxes are difficult to recycle, since the coating tends to hold the fibers together and makes them difficult to separate. Thus, conventional wax-based coatings cannot be separated to the degree necessary to enable satisfactory repulping of the board and typically contain particles of the coating ("stickies") which stick to the papermaking equipment, wire, presses and dryer cans and make the resulting furnish unsuitable for papermaking.

Since it has generally not been economical to repulp wax-coated board, used shipping boxes and the like made from water-repellant linerboard have typically been dumped into a landfill or incinerated rather than recycled. Not only is this practice wasteful, it is also environmentally undesirable and a contributing factor to the growing solid waste disposal problem.

In addition, conventional water repellant linerboard can be difficult to work with, especially under warm conditions, since conventional water-repellant coatings may become tacky causing stacked or contiguous sheets of coated board to block or stick together. This blocking often persists after the sheets are cooled and detrimentally affects handling of coated linerboard blanks and boxes made of coated linerboard.

Accordingly it is an object of the present invention to provide a water-repellant paperboard especially well-suited for use in the construction of corrugated boxes for shipment of perishable foods.

A further object of the present invention is to provide a water-repellant board of the character described which exhibits improved repulpability as compared with conventional wax coated boards.

An additional object of the present invention is to provide a water-repellant paperboard of the character described which exhibits improved release characteristics and improved resistance to blocking.

Still another object of the present invention is to provide a water-repellant paperboard of the character described which is economical to produce and to recycle.

Having regard to the foregoing and other objects and advantages, the present invention is directed to a water repellant paperboard which exhibits improved properties, particularly repulpability. The paperboard sheet is especially well suited for use as linerboard in the manufacture of corrugated boxes for shipping and storing food, particularly frozen foods such as ice-packed chicken, meat, fishery products, fruits and vegetables. The invention is useful in demanding applications which require a combination of high water repellency, high wet strength and durability under wet conditions for use in food containers.

In general, the invention is directed to a fibrous paper web such as paperboard having a water-repellant coating or film which includes wax and a polymer matrix of polymer chains ionically cross-linked through pendant carboxylic acid groups. The coating is applied as an aqueous formulation which is dried to provide the water-repellant coating on the paper web.

The essentially ionic character of the carboxylate bridge between the polymer chains is believed to confer a high degree of stability to acids and water (essentially neutral) to form a superior water repellant and substantially continuous film on the paperboard which is not readily attacked by conditions of normal use. The crosslink is also believed to increase the effective glass transition temperature of the coating, so that contiguous sheets of the coated paperboard are less likely to block.

As used herein, the term "water-repellant" merely refers to the hydrophobic character of the coating and its tendency to repel, block or not significantly absorb or transmit water in normal use. Thus, the term "water-repellant" is intended to include "water-resistant" and other terminology which connotes substantial as opposed to total or complete water blocking properties, and refers to a water-blocking property which is sufficient for the intended use requiring a degree of water-repellency.

Under alkaline conditions, such as when contacted with repulping liquors containing NaOH or ammonia solutions, the ionic bonds in the coating disassociate to permit the film to be broken up in a more highly divided form for enhanced repulpability as compared with conventional (wax) coatings. The wax particles confer water-repellency and enhance repulpability by interrupting the continuous film formed by the polymer matrix and limit the cohesive strength of the film.

The above and other features and advantages of the present invention will become further known from the following detailed description when considered in conjunction with the accompanying drawings in which.

Figure 1:
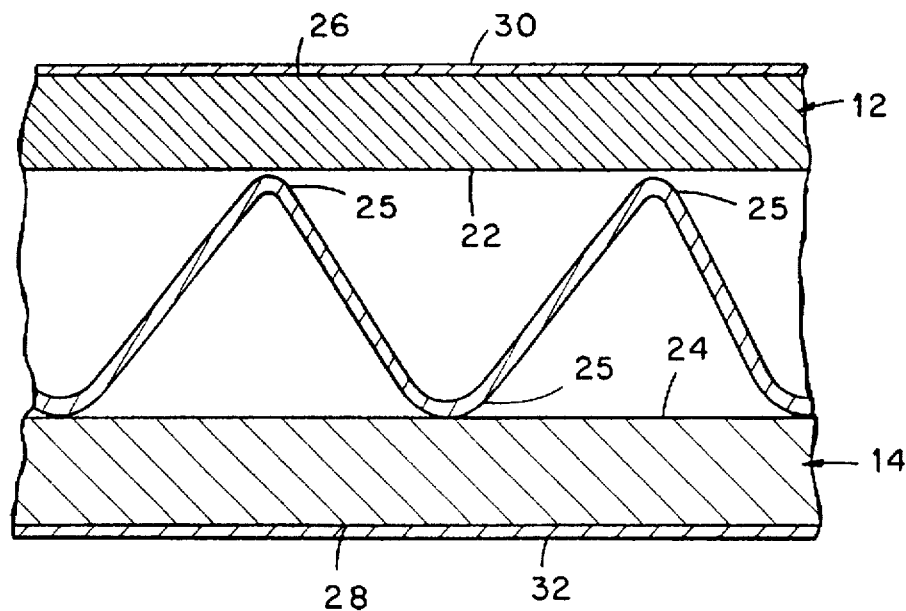
FIG. 1 is an enlarged cross-sectional view of a corrugated board incorporating a repulpable, water-repellant paperboard according to a preferred embodiment of the present invention.

With reference now to the drawings in which like reference characters designate like or similar parts throughout the several views, FIG. 1 shows a cross-section of a portion of a corrugated board 10 which, in the illustrated embodiment, is a combined construction of the double-face type having an inner linerboard 12 and an outer linerboard 14 supported in substantially parallel, spaced-apart relation by a corrugating medium or fluting 16. The board 10 of the illustrated embodiment is particularly well-suited for the production of shipping containers, as in the production of the open-top container 20 of FIG. 2 for shipment of frozen or meat, fruit, vegetables as well as ice-packed poultry and the like. The board 10 may thus be visualized as a portion of a blank for making such a container, or a portion of the assembled container.

The linerboards 12 and 14 each include interiorly facing surfaces 22 and 24, respectively, which are adhesively secured to tips 25 of the fluting 16 as by the application of a suitable adhesive to the tips of the flutes, such as an FDA approved starch based adhesive.

Each exteriorly facing surface 26 and 28 of linerboards 12 and 14 includes a coating or film layer 30 and 32, respectively, which comprises wax mixed with a polymer matrix of polymer chains ionically cross-linked through pendant carboxylate groups, which together with the wax confers water-repellency to the film but allows the coating to be repulpable under alkaline conditions. The coating is relatively stable under neutral and acidic conditions, but has been observed to disassociate under alkaline conditions encountered during repulping so that particles of the coating which are liberated from the fibrous portion of the linerboard in repulping are more finely divided in the resulting slurry.

The layers 30, 32 may be provided by applying through use of any suitable coating process, such as a rod and/or air knife coater, an aqueous coating including a carboxylated polymer and a wax emulsion with an ionic cross-linking agent to the surfaces 26 and 28 of linerboards 12 and 14. A preferred polymer for use in the coating is a styrene-butadiene (SB) copolymer, polymerized with monomers having carboxylic acid pendant groups, e.g., acrylic acid and methacrylic acid. An especially preferred SB polymer for use in the invention is the carboxylated styrene-butadiene latex available under the trade name RAP 314NA from Dow Chemical Company of Midland, Mich. This latex is believed to have a chemical formula as follows:

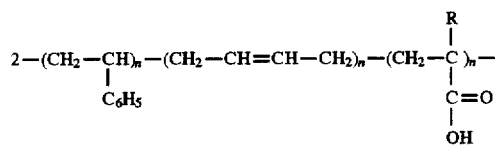

Where,

R=H, —(CH$_2$)$_n$H, etc.

Other ionically cross-linkable polymers which may be used include, by way of example and not by way of limitation:

1. Polyacrylates

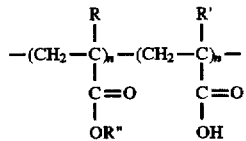

R  = H, CH$_3$
R'  = H, —(CH$_2$)$_n$H, etc.
R"  = CH$_3$, CH$_2$CH$_3$, CH$_2$)$_3$CH$_3$, 2. Styrenated Polyacrylates

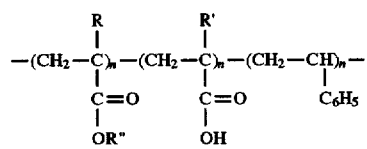

3. Vinylacetate Polyacrylates

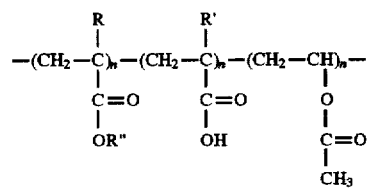

-continued
4. Poly(Vinylidene Chloride/Vinyl Chloride) Acrylate

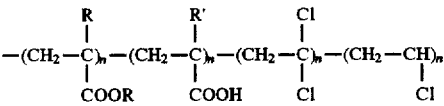

The polymer may comprise from about 60 to about 80 percent by weight of the coating application, and most preferably is provided in an amount equal to from about 20 to about 40 weight percent of wax emulsion.

The wax component of the coating is preferably provided by low molecular weight paraffin-polyethylene emulsion such as a mixture of a polyethylene (molecular weight in the range of from about 500 to about 2000), paraffin wax and an emulsifying agent. The polyethylene may comprise from about 1 to about 10 weight percent of the wax emulsion and the paraffin wax may comprise from about 30 to about 25 weight percent. The emulsifying agent may comprise up to 7 weight percent, with the balance water. The wax emulsion may comprise from about 20 to about 40 weight percent of the coating and is most preferably provided in a concentration of about 35–55 weight percent.

A particularly preferred wax emulsion is the paraffin/polyethylene emulsion available under the trade name Mobilcer 136 from Mobil Oil Corporation of Fairfax, Va. Other suitable wax emulsions include paraffin/microcrystalline wax emulsions such as the wax emulsion sold under the trade designation Mobilcer J of Mobil Oil Corporation of Fairfax, Va. and the wax emulsion available under the trade name Mobilcer MTD 216 from the Mobil Oil Company of Fairfax, Va. In addition, wax emulsions based on carnauba wax, carnauba/paraffin wax, carnauba/microcrystalline and carnauba/polyethylene resin may be used.

The crosslinking agent component of the coating is preferably a metal oxide such as the zinc oxide ammonium complex available under the trade designation Zinplex 15 from Ultra Additives, Inc. of Paterson, N.J. Other suitable crosslinking agents include ammonium zirconium carbonate crosslinkers such as the ammonium zirconium carbonate composition available under the trade name HTI Insolubilizer 5800 M from Hopton Technologies, Inc. Albany, Oreg. The crosslinking component may comprise 5 to 30 parts by weight of the coating and preferably makes up about 10–20 percent of the coating by weight.

The composition of the coatings 30 and 32 may further include thickeners to modify the viscosity of the composition for application of the coating. A suitable thickener is the cellulose gum rheological property modifier available under the trade designation Admiral 3089FS available from Aqualon Company of Willmington, Del. Sodium or ammonium polyacrylates may also be used as thickeners for the composition.

In addition, organic silicone free or silicone-based defoamers may be used. Preferred defoamers are an organic, silicone-free defoamer available under the trade name Colloid 682 from Rhone-Poulenc of Marietta, Ga. and an organic, silicone-free defoamer available from Witco Chemical of New York, N.Y. under the trademark Bubble-Breaker 748. These defoamers are preferably used in an amount ranging from about 0.05 to about 0.5 percent by weight based on the total weight of the coating. Pigments may also be added, such as to impart a whitish color for aesthetics.

The coating is preferably applied at the rate of from about 2 to about 3 pounds dry per 1,000 sq. ft. of board at a viscosity in the range of 400 to 700 cps such that the coating will comprise from about 2 to about 3 percent of the total weight of the board. Conventional board coated to provide approximately the same water resistance typically has a wax coating weight of between about 5–8 lbs/msf. Thus, a significant advantage of the present invention is that the desired water resistance may be realized with a coating provided in an amount which is only about 25–35% of that required when conventional wax coatings are used.

The cross-linking reaction occurs in the process of drying the coated board which may be carried out using forced hot air and conventional can-dryers as by threading the web with the coating thereon through a stack of rotating cans, which advance the web through the dryers alternatively exposing opposite faces of the web to the hot surfaces of the cans. Preferably, the coated board is pre-dried before contacting the surfaces of the dryer cans by non-contact heating such as forced hot air (temp. 200°–400° F.) for 5–15+ seconds to dry the coating to at least a substantially non-sticky state prior to contact drying at the can dryers.

The ionic bonding is believed to provide the coating with a polymer matrix represented generally by the formula P-S-CO2-M-O$_2$C-S-P, wherein P represents the polymer as in the preferred styrene-butadiene polymer, S represents a polymer side chain, $CO_2$ and $O_2C$ represent carboxylic groups and M represents a metal, such as zinc, from the cross-linking agent (such as zinc oxide ammonium complex) providing the ionic cross-link or bridge between adjacent polymer chains.

The ionic crosslinking reaction for a styrene-butadiene acrylate copolymer emulsion/zinc oxide ammonium complex is believed to be as follows:

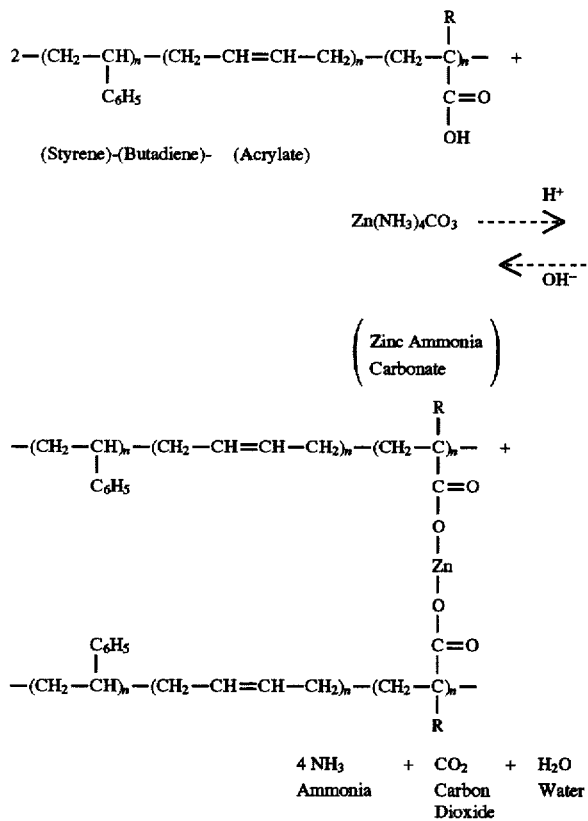

Where,
R=H, —(CH$_2$)$_n$H, etc.

With respect to the above example, it is believed that substantially all of the free ammonia resulting from the cross-linking reaction is liberated as ammonia gas during drying, and is therefore not present in the dried coating. In addition, it is believed that substantially all of the carbon dioxide and water reaction products are liberated during drying so that the dried coating is essentially void of reaction side products.

The fibrous web of the linerboards 12 and 14 may be of conventional construction including 1, 2, 3 or more plies (multi-ply), forming a composite web. The board may further have a conventional thickness C of from about 0.008 to about 0.03 inches and a weight of from about 26 to about pounds per 1,000 sq. ft.

In the case in which the linerboard is to be used in the manufacture of corrugated containers for shipping ice-packed perishables, which is a use for which the invention is particularly well-suited, the fibrous web of the linerboards 12 and 14 may desirably comprise a high wet-strength paperboard produced by any of the known techniques. Generally speaking, wet-strength paper is a paper which retains 15 percent or more of its dry strength when thoroughly wetted with water.

A number of available paperboard products have wet strength in the range of 30 to 40 percent of the dry strength. Wet strength may be conferred by addition of wet-strength resins such as derivatives of urea-formaldehyde, melamine-formaldehyde and polyamide-epichlorohydrin added to the furnish stock after the last refiner in the papermaking machine. The benefits of the present invention are important in facilitating the repulping of wet strength paper which has generally been considered more difficult to repulp due to the presence of wet-strength resins. That is, although wet-strength paper is a material of choice for corrugated containers for shipping perishables due to the presence of water, the modification of the linerboard which confers wet strength coupled with the presence of resin or wax surface-coatings has compounded the difficulties in repulping this material. The surface coating of the present invention provides improved repulpability of such composites and, thus, lessens the repulping problems inherent in the use of wet strength wax-coated board.

For packaging applications such as meat, fruit, and vegetables, non-wet strength linerboard substrates such as 57 lb PL (pineliner) or 69 K (kraft) were coated with aqueous based barrier coating formulations. For shipping meat, the inside of the corrugated box is preferably coated for obtaining properties such as water/grease resistance and release properties at freezer conditions at 15°–30° F. In the cases of boxes for fruit and vegetables, both the inside and outside surfaces of the corrugated boxes are preferably coated to provide water resistance sufficient to withstand the conditions encountered in the field, processing plants, storage, and distribution in cooler environment at 35°–45° F. For meat, fruit, and vegetables applications, the board was observed to be readily repulpable with uncoated corrugated containers at 100°–120° F. and pH of 7–8, which are the standard commercial repulping conditions for recycled medium plant such as Waldorf Corporation in Minneapolis, Minn.

Figure 2:
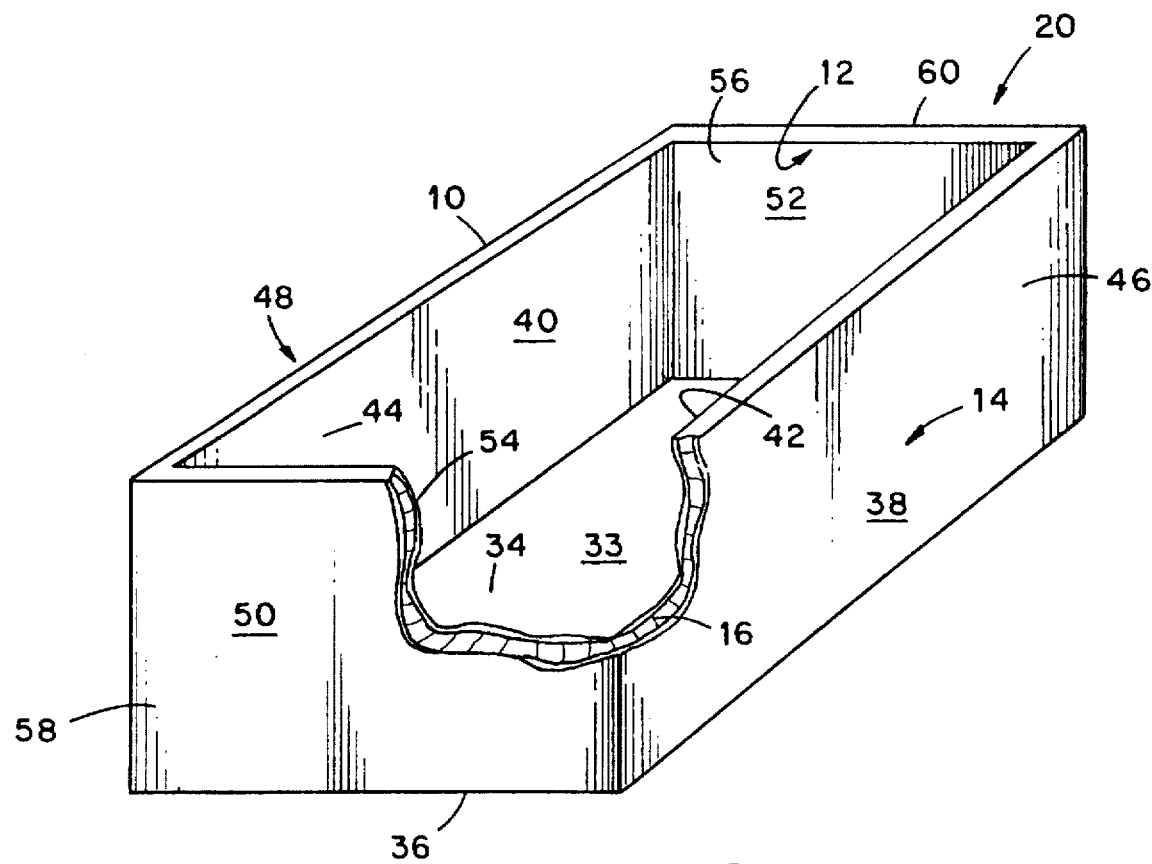
FIG. 2 is a perspective view of a corrugated container incorporating the board of FIG. 1.

With further reference to FIG. 2, the container 20 may be erected from a single blank (not shown) produced from the corrugated board 10 by folding along score lines and/or gluing the blank in a manner well known in the art. The coating layers 30 and 32 are compatible with the use of lap-gluing adhesives conventionally used for coated boards, and the coating readily accepts water-based flexo inks.

The container 20 of the illustrated embodiment is of a type suitable for shipping iced perishables and includes a bottom panel 33 having an upwardly facing inner surface 34 and a downwardly facing outer surface 36. A pair of side panels 38 and 40 extend upwardly from opposite sides of the bottom panel 33 and include inwardly facing inner surfaces 42 and 44, respectively, and outwardly facing outer surfaces 46 and 48, respectively. A pair of end panels 50 and 52 extend upwardly from opposite sides of the bottom panel 33 adjacent the side panels 38 and 40. The end panels 50 and 52 likewise include inwardly facing inner surfaces 54 and 56, respectively, and outwardly facing outer surfaces 58 and 60.

Each inner surface 34, 42, 44, 54 and 56 of the container 20 may be provided by surface 26 of the corrugated board 10 coated with layer 30. Similarly, each outer surface 36, 46, 48, 58 and 60 is provided by surface 28 of the board 10 coated with coating layer 32. A top (not shown) may also be constructed of the board 10 of FIG. 1 to include short depending walls which fittingly receive the upper ends of panels 38, 40, 50 and 52. As mentioned above, however, it may only be necessary to coat the exteriorly facing surface of the top.

It will be seen that perishables and ice loaded within the container will be adjacent the water-repellant inner surfaces of the container. This restricts penetration of water and other fluids such as blood or juices into the container. Likewise, the water repellant outer surfaces limit entry of water and other fluids into the container 12 to avoid contamination of the contents. The provision of water repellant surfaces on both the interior and exterior of the container thus provides a container especially well suited for use where flow of fluid into and out of the container is to be avoided.

It will be appreciated that the use of the corrugated bard 10 in the container 12 containing linerboards 12 and 14 coated in accordance with the invention improves the repulpability of the box so that containers made from such board may be more readily and more economically recycled than boxes made of conventionally (wax) coated water-repellant paperboard, and provides a recycled pulp of improved quality. Thus, it has been observed that under acidic conditions; i.e., below about pH 7, the ionic cross-linking between adjacent carboxylic acid groups of the polymer matrix provides a highly water resistant or hydrophobic film on the board surface which is of sufficient strength and integrity to withstand typical shipping and storage conditions encountered when shipping ice-packed perishables.

It has also been observed that a board coated according to the present invention exhibits improved repulpability as compared with water-repellant boards such as wax-coated boards and boards coated with polyethylene resin or extrudable film-forming thermoplastic resins such as polypropylene, polyamides, and ethylene/vinyl acetate co-polymers as well as polyolefin coatings, to name a few. It is further believed that the network of ionic crosslinking is not as stable to conventional alkaline media such as sodium hydroxide-based systems used in repulping as chemically cured compositions; i.e., coating compositions having covalent bonds formed by chemical reaction and/or heat. That is, under alkaline conditions; i.e., substantially above about pH 7, and especially under typical repulping conditions of pH 8 to 11 and 100° F. to 160° F., it is believed that the ionic bonds of the coated board of the invention more readily disassociate so that the coating breaks into smaller fragments faster for enhanced repulpability. The wax particles in the coating are believed to contribute to repulpability by interrupting the continuity or ordering of the cross-linked polymer chains, thereby lowering the cohesive strength of the film so that it is more readily dispersed during repulping.

In addition to facilitating repulping of the paperboard, the coating of the invention is believed to provide improved release characteristics (release and high slip) and an increase in the glass transition temperature of the protective layer as compared with conventional coated boards of the type used in providing water-repellant shipping containers, to provide increased resistance to blocking.

Furthermore, it has been observed that board produced in accordance with the present invention has a slide angle of about 9 degrees as compared to a slide angle of between about 16–17 degrees for wax coated boxes. This improved slide angle is advantageous to enhance the release characteristics of meat boxes and facilitate removal of frozen meat from the container.

Additionally, board produced in accordance with the present invention exhibits improved resistance to blocking under warm and humid conditions. This generally improves the handling properties of the board in relation to stacking of flattened-out boards or blanks and conveyance of the board through the stages of manufacture, and limits blocking of adjacent boxes in shipment and storage.

Figure 3:
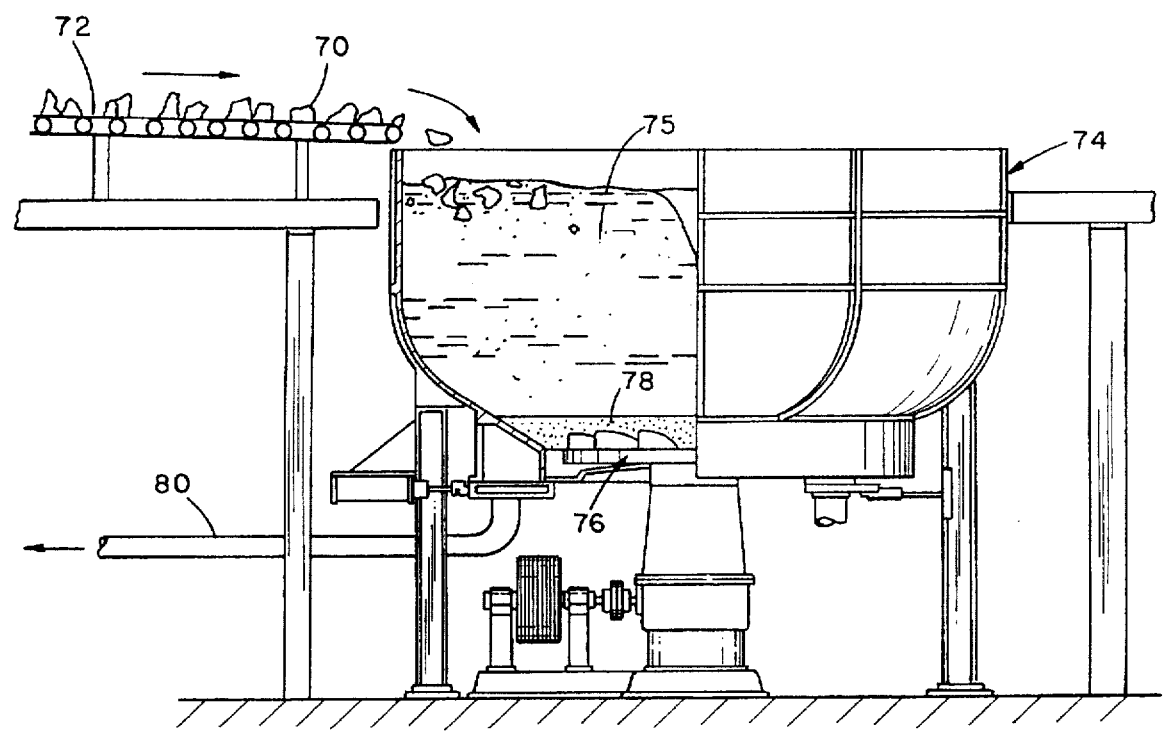
FIG. 3 is a diagrammatic view illustrating a process for recycling board according to the present invention.

With reference now to FIG. 3, there is shown a diagrammatic representation of the repulping portion of a process for recycling linerboard and containers provided in accordance with the present invention. In the process, waste paper or board 70 (i.e. dirty stock and also used boxes and paperboards, as well as papermill broke) in loose or baled form containing linerboard coated according to the present invention is charged, as by conveyor 72 or by hand as is the practice in many mills, into a conventional pulper known as a hydrapulper shown at 74. The hydrapulper 74 contains a sufficient amount of alkali such as NaOH and ammonia to provide a mixture 75 of waste paper and alkaline liquid having a consistency of between about 4 to 18 percent.

The hydrapulper 74 includes an agitator 76, such as a rotor, for agitating the mixture of waste paper and cooking liquor and may also include a heater such as a steam coil for maintaining a desired temperature in the mixture.

In the process, the stock and cooking liquor may be charged to the hydrapulper 74 continuously or on a batch basis and the resulting mixture agitated or subjected to agitation for a time sufficient to accomplish repulping of the waste paper to the necessary degree. When the stock has been reduced to the desired degree, it passes through a perforated plate 78 in slurry form and the slurry may then be directed for further processing as by conduit 80, such as to deflakers, secondary pulpers, screens, cleaners and refiners to further defiberize and prepare the pulp for papermaking.

The operating conditions of the pulper 74 are selected in accordance with the composition of the waste paper, and operation of the pulper for repulping of the waste paper 70 may be accomplished in a conventional manner, but may economically include used coated board as a repulpable material with improved results by virtue of the enhanced repulpability of the board of the invention. For example, to repulp a board provided in accordance with the present invention which includes wet strength pulp, the hydrapulper may be operated at conditions common for the repulping of wet-strength paper, such as the conditions set forth below in the first column of Table 1. For non-wet strength board, the milder conditions set forth in the second column of Table 1 may be employed.

TABLE 1

|  | Wet Strength Pulp | Non Wet Strength Pulp |
|---|---|---|
| Temperature | 140° F.–160° F. | 80° F.–120° F. |
| pH | 10–11 | 7.6 |
| Time | 30–60 min | 10–20 min |
| rotor tip speed | 3,500 ft/min | 3,500 ft/min |

Again, it is believed that the alkaline conditions within the pulper causes destruction of the ionic cross-linkages between adjacent carboxylic acid groups of the coating. This reduces the strength of the coating so that the action of the pulper breaks the coating down into particles of reduced size. Also, it has been observed that particles from the coated board of the present invention are "substantially free", which is used herein to mean that the coating substantially separates from the fibers and does not retain a significant amount of adhered or embedded pulp fibers when the board is repulped. This provides an improved recycled pulp/coating particle mixture for use in the production of paper products, particularly linerboard for boxboard applications.

While the mixture of pulp/coating particles is suitable for use in the manufacture of paper products, it will be understood that the mixture may be added with furnish derived from conventional recycling processes, and new furnish containing virgin pulp. In addition, it will be understood that a purer furnish (a higher percentage of pulp) may also be accomplished by subjecting the mixture to mechanical separation techniques (i.e. centrifugal separation) to separate the coating particles from the pulp.

EXAMPLE 1

A coating for application to a board was prepared by charging 614 lbs of Dow Latex RAP 314 NA to a mixing vessel equipped with an agitator and agitation was begun. The agitator was positioned at least one foot below the surface of the latex to avoid foaming. To this was added 700 grams of Colloid 682 as a defoamer. Then, 154 lbs. Mobilcer 136 was added to the vessel and agitation was continued for five (5) minutes. The Mobilcer 136 was added below the surface of the mixture to further control foaming.

A diluted charge of Zinplex 15 crosslinker was prepared by adding 15 pounds of Zinplex 15 to 15 pounds of water. This mixture was added to the latex/wax blend to provide a pH of about 8.5. Following this, the rest of Zinplex, 110 pounds (full strength) was charged. After this, 1900 grams Admiral 3089 FS was added to the vortex of the agitated latex and the resulting mixture was stirred for 15 minutes.

The resulting coating mixture had a solids content of about 41%, a pH of about 9.5 and a viscosity of about 800 cps.

The coating was applied at a temperature of about 25° C.–30° C. to 69 lb grade IPB (International Poultry Box) linerboard (wet strength) in a single pass at a coating weight of about 2.5–3.0 lb (dry)/1000 ft$^2$ using a Michelman MRC-1000 rod coater followed by forced hot air and contact drying. The coated linerboard was converted to a double-faced corrugated board in a conventional corrugator and the coated board was observed to pass through the corrugator at a temperature of 350° F. trouble-free. The stack of corrugated sheets had a temperature of 150°–185° F. during normal operation and the corrugated board stacks exhibited no significant sticking/blocking after prolonged storage under the stack pressure and temperature.

The finished corrugated sheets were printed with aqueous flexo inks and die-cut using a rotary printer/die-cutter with a lead edge feeder. The converting rate was about 160–200 blanks/minute. Good dry-rub resistance was observed on the printed surface. The die cut blanks were formed into boxes.

Fresh chicken breast parts were packed into the boxes and covered with ice chips. The boxes were stored in a refrigerated cooler for 4–16 hours at 38° F.–43° F. The boxes were then shipped by refrigerated truck for 260 miles at 26° F. The boxes performed as well as the conventionally curtain-coated wax boxes. The board was observed to be readily repulpable at 146° F. and pH of 8–11.

EXAMPLE 2

Board produced in accordance with Example I (30%) was combined with conventional uncoated board (70%) and defibered in a hydrapulper operated at 110° F./4–18% consistency/pH 7.6. No operational problems were observed.

EXAMPLE 3

Coating produced in accordance with Example I was applied at a temperature of about 25°–30° C. to either 57 lb PL (pineliner) or 69 K (kraft) non-wet strength linerboard substrates in a single pass at a coating weight of about 2.0–2.5 dry lbs/1000 ft$^2$ using a Black-Clawson air knife coater followed by forced hot air drying. The coated linerboard was converted to a double-faced corrugated board in a corrugator and the coated board was observed to pass through the corrugator at a temperature of about 350° F. trouble-free. The stack of corrugated sheets had a temperature of 170°–185° F. during normal operation and the corrugated board stacks exhibited no significant sticking/blocking after prolonged storage under the stack pressure and temperature.

The finished corrugated sheets were printed with aqueous flexo inks and die-cut using a rotary printer/die-cutter with a lead edge feeder. Printed blanks were folded and glued with hot melt adhesives. The converting rate was about 200–250 blanks/minute. Good dry-rub resistance was observed on the printed surface.

Fresh lettuce was harvested from the field, washed, and packaged with water spray in boxes formed from the corrugated sheets. The boxes were stored in a cooler at 35°–45° F. for a period of several hours. The board was observed to be readily repulpable with uncoated corrugated board (OCC) at 100°–120° F. and pH of 7–8.

EXAMPLE 4

Coating produced in accordance with Example I was applied at a temperature of about 25°–30° C. to 57 lb PL (pineliner) and 69 K (kraft) non-wet strength linerboard substrates in a single pass at a coating weight of about 1.8–2.3 dry lbs/1000 ft$^2$ using a Black-Clawson air knife coater followed by forced hot air drying. In each case the coated linerboard was converted to a single-faced corrugated board in a corrugator and the coated board was observed to pass through the corrugator at a temperature of 350° F. trouble-free. The barrier coated side was the inside of the box for water/grease resistance and release properties. Each stack of corrugated sheets had a temperature of 165°–175° F. during normal operation and the corrugated board stacks exhibited no significant sticking/blocking after prolonged storage under the stack pressure and temperature.

The uncoated side of the finished corrugated sheets were printed with aqueous flexo inks and die-cut using a rotary printer/die-cutter with a lead edge feeder. Printed blanks were folded and glued with hot melt adhesives. The converting rate was about 200–250 blanks/minute.

Fresh meat chunks were cut, washed, and packaged in boxes formed from the corrugated sheets. The boxes were stored in a freezer at 15°–30° F. for a period of several hours. The meat chunks were observed to be easily removed from the boxes and did not stick to the boxes. The bard was observed to be readily repulpable with other uncoated board at 100°–120° F. and pH of 7–8.

EXAMPLE 5

Non-wet strength paperboard (such as 35–69 lbs kraft) produced in accordance with Examples 3 and 4 was defibered in a laboratory blender operated at 100°–120° F./pH of 7–8/4% consistency.

Finished stock was further diluted down to 0.2% consistency with tap water. Handsheets were made from the stock using a standard TAPPI sheet mold. Handsheets with uniform formation without any stickies and non-defibered lumps were seen after 40–60 seconds of repulping time.

Conventional curtain-coating wax coated board (non-wet strength) was defibered in the laboratory blender under the same conditions. Curtain-coating wax layers were observed to break into small size agglomerates, which were visible and not acceptable for papermaking. Also, non-defibered lumps were observed in the handsheet.

EXAMPLE 6

Wet-strength paperboard coated in accordance with Example 1 was defibered in a laboratory blender operated at 120°–140° F./pH of 10–11/2.5% consistency.

Finished stock was further diluted down to 0.2% consistency with tap water. Handhseets were made from the stock using a standard TAPPI sheet mold. The sheets showed satisfactory defibering and were free from "stickies" after 40–60 seconds repulping time.

Conventional curtain-coating wax coated wet-strength board was defibered in the same device and conditions for comparison purposes. Curtain-coating wax layers broke into small size agglomerates, which were visible and unacceptable for papermaking. Non-defibered lumps were also observed in the handsheet.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. A water-repellant paperboard comprising a fibrous web having a coating consisting essentially of:
    a wax component selected from the group consisting of paraffin wax and polyethylene wax emulsions and mixtures thereof; and
    a polymer matrix of polymer chains comprising a polystyrene-butadiene polymer copolymerized with a monomer having pendant carboxylic acid groups;
    wherein said pendant carboxylic acid groups of said polymer chains are cross-linked by a zinc ion ionically bonded between carboxylic acid groups of adjacent polymer chains.

2. The paperboard of claim 1, wherein said fibrous web comprises wet strength pulp.

3. The paperboard of claim 1, wherein said fibrous web comprises non-wet strength pulp.

4. The paperboard of claim 1, wherein said wax component contains wax particles which limit the cohesive strength of said polymer matrix.

5. The paperboard of claim 1, wherein the coating is applied as an aqueous formulation to the fibrous web and the wax component is provided in the formulation as an emulsion.

6. A coating formulation for application to a surface of a paperboard to provide a water-repellant coating which consists essentially of:
    a carboxylated polymer comprising a polystyrene-butadiene polymer copolymerized with a monomer having carboxylic acid pendant groups;
    a wax component selected from the group consisting of paraffin wax and polyethylene wax emulsions and mixtures thereof; and
    a cross-linking agent which provides zinc ions;
    wherein said cross-linking agent reacts with said polymer to provide ionic cross-linking between the carboxylic acid groups of the carboxylated polymer to create an ionically cross-linked polymer matrix in the resulting coating.

7. The coating formulation of claim 6 wherein said cross-linking agent is selected from the group consisting of zinc oxide ammonium complexes and zirconium ammonium complexes.

8. A corrugated board which comprises:
    fluting having a first side and a second side;
    a first linerboard having an inner surface adjacent to, facing and adhered to said first side of said fluting and an outer surface opposite said inner surface;
    a second linerboard having an inner surface adjacent to, facing and adhered to said second side of said fluting and an outer surface opposite said inner surface; and
    at least one of said outer surfaces of said first or second linerboard having a coating thereon which consists essentially of a wax component selected from the group consisting of paraffin wax and polyethylene wax emulsions and mixtures thereof; in a polymer matrix of polymer chains comprising a polystyrene-butadiene polymer copolymerized with a monomer having pendant carboxylic acid groups; wherein said pendant carboxylic acid groups of said polymer chains are cross-linked by a zinc ion ionically bonded between carboxylic acid groups of adjacent polymer chains;
    wherein the corrugated board exhibits improved repulpability and resistance to blocking.

9. The board of claim 8, wherein the outside surface of each of said linerboards include said coating.

10. A method of making a water-repellant fibrous web which comprises:
    providing a fibrous web having a surface to be made water-repellant;
    applying to the surface of the web an aqueous coating which consists essentially of a carboxylated polymer comprising a polystyrene-butadiene polymer copolymerized with a monomer having carboxylic acid pendant groups, a wax component selected from the group consisting of paraffin wax and polyethylene wax emulsions and mixtures thereof and a cross-linking agent which provides zinc ions; and reacting the cross-linking agent with the carboxylic acid groups of the polymer to cause the formation of ionic cross-linkages between the carboxylic acid groups of adjacent polymer chains and provide a substantially solid water-repellant coating on the surface of the web.

11. The method of claim 10, wherein the fibrous web has wet strength.

12. The method of claim 10, wherein the cross-linking agent is reacted with the carboxylic acid groups of the polymer by heating the aqueous coating application.

13. The method of claim 10, wherein the cross-linking agent comprises a zinc oxide ammonium complex.

* * * * *

UNITED STATES PATENT AND TRADEMARK OFFICE
CERTIFICATE OF CORRECTION

PATENT NO. : 5,626,945
DATED : May 6, 1997
INVENTOR(S) : Arnold L. Berzins, Tung C. Ma and Charles J. Davis It is certified that error appears in the above-indentified patent and that said Letters Patent is hereby corrected as shown below:

On the title page of the patent delete the following disclaimer language:

"The portion of the term of this patent subsequent to Aug. 15, 2014, has been disclaimed."

Column 6, line 13, after "about 26 to about" insert --90--;

Column 7, line 31, change "bard to --board--;

Column 11, line 8, change "bard" to --board--;

Claim 7, column 12, line 33, after "complexes" delete "and zirconium ammonium complexes".

Signed and Sealed this

Sixteenth Day of September, 1997

Attest:

BRUCE LEHMAN

*Attesting Officer*  *Commissioner of Patents and Trademarks*